UNITED STATES PATENT OFFICE.

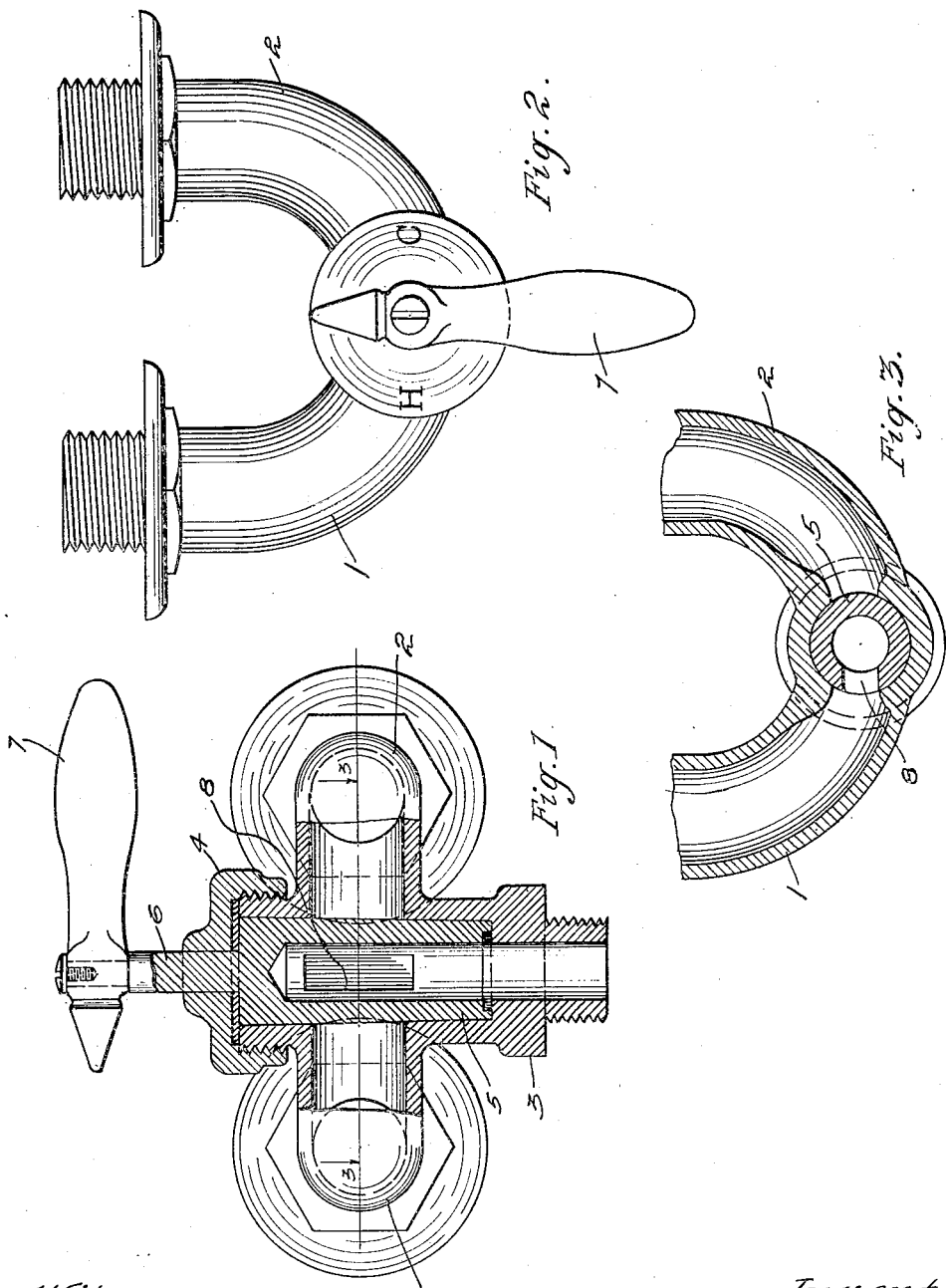

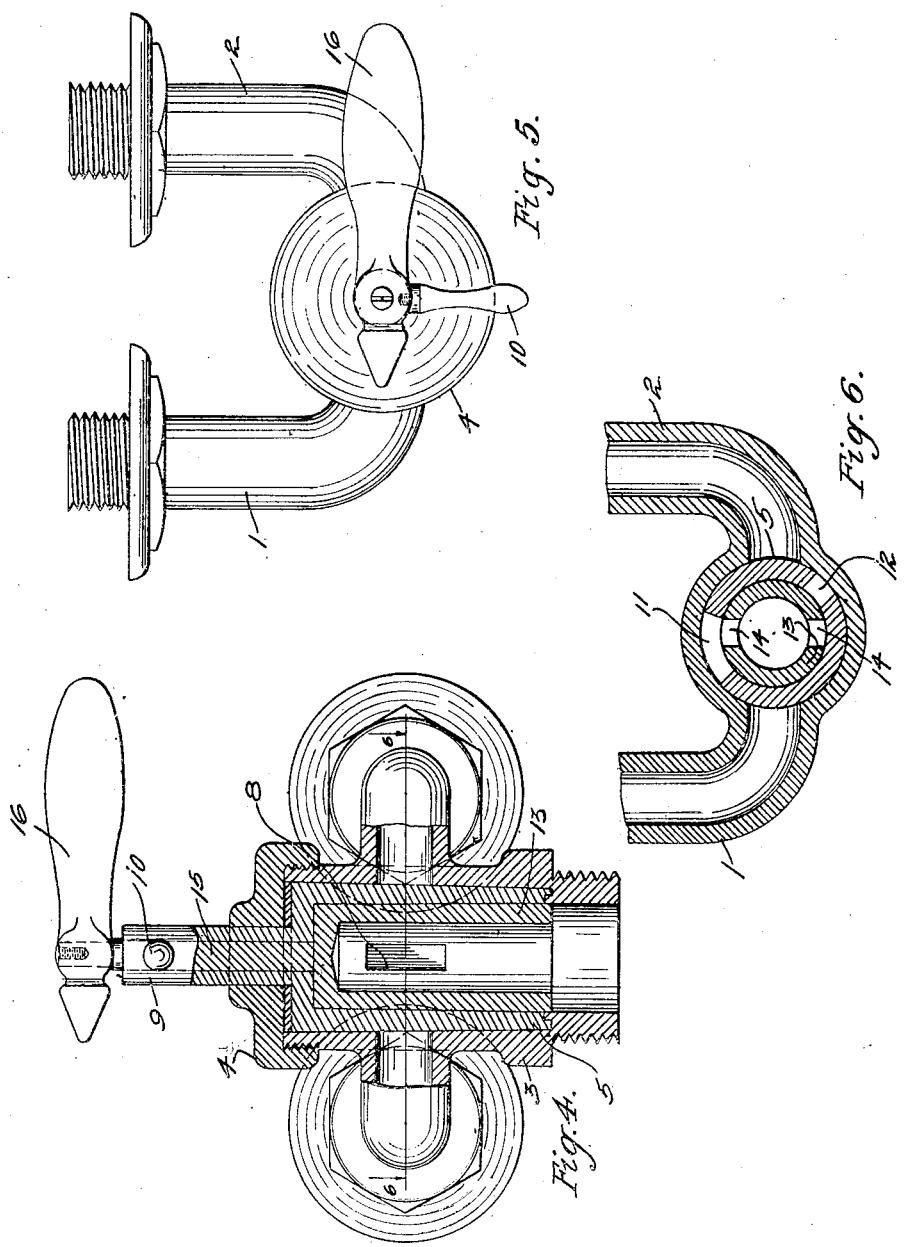

EMIL TAKALA, OF LEADVILLE, COLORADO.

FAUCET.

1,354,522.  Specification of Letters Patent.  Patented Oct. 5, 1920.

Application filed September 19, 1918. Serial No. 254,765.

*To all whom it may concern:*

Be it known that I, EMIL TAKALA, a citizen of Finland, residing at Leadville, in the county of Lake and State of Colorado, have invented certain new and useful Improvements in Faucets, of which the following is a specification.

This invention relates to improvements in faucets for hot and cold water. One object is to provide a faucet of very simple construction that is positive and efficient in operation. A further object is to provide a single faucet for use in drawing off either hot or cold water or both together when desired. With the foregoing and other objects in view the invention consists in the combination and arrangement of parts to be hereinafter fully described, pointed out in the appended claim and illustrated in the accompanying drawings which form a part of this specification and in which—

Figure 1 is a longitudinal sectional view through my improved faucet illustrating its application.

Fig. 2 is a top plan view of Fig. 1.

Fig. 3 is a section on line 3—3 of Fig. 1.

Fig. 4 is a longitudinal sectional view through a slightly modified form of faucet showing its application.

Fig. 5 is a top plan view of Fig. 4.

Fig. 6 is a section taken on line 6—6 of Fig. 4.

Like reference characters denote corresponding parts throughout the several views.

The reference numerals 1, 2 denote the hot and cold water pipes which are connected by the jacket 3 that is threaded at one end to receive the cap 4. Within the jacket 3 I provide the turning plug 5 which is open at its lower end to form a discharge outlet. Referring to Figs. 1, 2 and 3 the turning plug is provided with the stem 6 that extends up through the cap 4 and that is provided with the handle 7 by means of which it is turned. The said plug 5 is formed with a perforation 8 adapted to register either with the pipe 1 to draw off hot water or to register with the pipe 2 to draw off cold water.

The plug 5 illustrated in Figs. 4, 5 and 6 is provided with the tubular stem 9 provided with the operating handle 10, said plug 5 being formed with the large perforation 11 and the small perforation 12 which perforations may or may not register with the pipes 1, 2. Within the plug 5 is a plug 13 formed with the diametrically opposed perforations 14 one of which may register with the perforation 11 of plug 5 while the other perforation is either in or out of registration with the perforation 12. The plug 13 is provided with the stem 15 that extends through the stem 9 and that is provided with the handle 16. Ordinarily the handle 10 is used to turn the plug 5 to cause its perforations to move into or out of registration with the pipes 1, 2. Hot and cold water will then flow from the pipes 1, 2 into the plugs 5, 13 provided the perforations 14 register with the perforations 11, 12; but if only one perforation 14 registers with the perforation 11 and the other perforation 14 is out of registry with the perforation 12 only hot or cold water will be drawn off. In using the handle 10 alone the two plugs 5, 13 will turn together through friction but for positive relative movement of the said plugs the handles 10 and 16 are both used.

What is claimed is:—

In combination with water pipes disposed in a common horizontal plane and having a capped jacket connection provided with a discharge outlet, said jacket connection and water pipes being intercommunicating, a vertically disposed rotary plug arranged in said jacket and formed with a large and a small perforation, said plug perforations being adapted to register jointly with said water pipes, or one of said plug perforations being adapted to register singly with one of said water pipes, a handle for said plug, a second rotary plug arranged within said first named plug and formed with oppositely disposed perforations adapted to register singly with the large perforation in said first named plug or jointly with said large and small perforations, and a handle for said second plug.

In testimony that I claim the foregoing as my own I have hereto affixed my signature in the presence of two subscribing witnesses.

EMIL TAKALA.

Witnesses:
ZELLA S. ANDERSON,
GUSTAF RANTALA.